US006258919B1

(12) United States Patent
Vogel et al.

(10) Patent No.: US 6,258,919 B1
(45) Date of Patent: Jul. 10, 2001

(54) CURABLE EPOXY RESIN COMPOSITIONS CONTAINING WATER-PROCESSABLE POLYAMINE HARDENERS

(75) Inventors: Thomas Vogel, Weil am Rhein/Haltingen (DE); Alex Wegmann, Allschwil (CH)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/142,269

(22) PCT Filed: Feb. 28, 1997

(86) PCT No.: PCT/EP97/00979

§ 371 Date: Sep. 3, 1998

§ 102(e) Date: Sep. 3, 1998

(87) PCT Pub. No.: WO97/33931

PCT Pub. Date: Sep. 18, 1997

(30) Foreign Application Priority Data

Mar. 11, 1996 (CH) .................................................. 634/96

(51) Int. Cl.[7] .................................................. C08G 59/64
(52) U.S. Cl. .................................. 528/111; 523/428
(58) Field of Search ............................ 523/428; 528/111

(56) References Cited

U.S. PATENT DOCUMENTS

| | | | |
|---|---|---|---|
| 3,280,054 | 10/1966 | Gotze et al. | 260/18 |
| 3,383,347 | 5/1968 | Pettit | 260/28 |
| 4,093,594 | 6/1978 | Anderson | 260/47 |
| 4,246,148 | 1/1981 | Shimp et al. | 260/18 |
| 4,397,998 | * 8/1983 | De La Mare et al. | 525/420.5 |
| 4,608,405 | 8/1986 | DeGooyer | 523/404 |
| 5,310,770 | 5/1994 | DeGooyer et al. | 523/414 |
| 5,539,023 | 7/1996 | Dreischhoff et al. | 523/404 |
| 5,587,409 | 12/1996 | Dreischhoff et al. | 523/404 |

FOREIGN PATENT DOCUMENTS

| | | |
|---|---|---|
| 487 955 | 5/1970 | (CH) . |
| 1 925 941 | 5/1969 | (DE) . |
| 1 520 918 | 4/1970 | (DE) . |
| 2 332 177 | 2/1974 | (DE) . |
| 610 787 | 8/1994 | (EP) . |
| 5-311140 | * 11/1993 | (JP) . |

OTHER PUBLICATIONS

Texaco Chem. Co., Water Reducible Coatings via Epoxy Modification with Jeffamine ED–2001 and 17–1000, p. 4, 1984.*
Handbook of Epoxy Resins, McGraw–Hill Book, N.Y. 1967, Chapter 10 pp. 1–12.
English Lang. Translation of Japanese OPI 05–311140 and Abstract thereof.
Derwent Abst. No. 74–11771V [07] of DE 2 332 177.
Derwent Abst. No. 73–44273U [32] of DE 1520918.
Derwent Abst. No. 68–39956Q [00] of DE 1925941.
Derwent Abst. No. 68–06184Q [00] of CH 487 955.
Patent Abstracts of Japan No. 06 179 801 of Application No. 04 33 44 22.

* cited by examiner

Primary Examiner—Robert Dawson
Assistant Examiner—D. Aylward
(74) Attorney, Agent, or Firm—Lyon & Lyon LLP; Kristin H. Neuman; James H. Shalek

(57) ABSTRACT

A curable composition is described, comprising a) 10 to 90% by weight of at least one, optionally water-dilutable, water-emulsifiable or water-dispersible, epoxy resin having more than one epoxy group in the molecule; b) 90 to 10% by weight of at least one polyamine adduct which predominantly corresponds to the idealised formula (I) and which is prepared from an adduct of formula (A) and a polyamine of formula (XII), wherein the sum of the percentages by weight of components (a) and (b) is always 100%; c) optionally, at least one further aliphatic, cycloaliphatic, aromatic/aliphatic, aromatic or heteroaromatic mono- or polyamine which may optionally be modified by adduction; and d) optionally, at least one customary additive, $R^1$ and $R^2$ and also m and n and B being defined in more detail in the description. The novel compositions are used for the preparation of colourants and coatings.

13 Claims, No Drawings

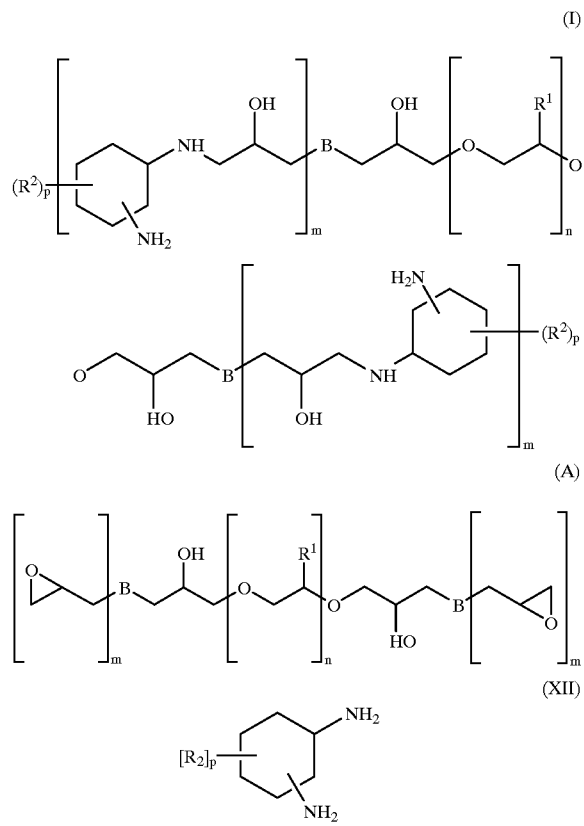

CURABLE EPOXY RESIN COMPOSITIONS CONTAINING WATER-PROCESSABLE POLYAMINE HARDENERS

The present invention relates to curable compositions comprising an epoxy resin and specific water-processable polyamine hardeners and optional further customary additives, to the use thereof for the preparation of moulded articles, in particular of coatings, as well as to the cured moulded articles and coatings, and also to specific polyamine hardeners.

Polyamidoamines, which contain free amino groups and which can be prepared from polyalkylene polyamines and polymerised unsaturated natural fatty acids, can be used for curing epoxy resins [see Lee & Neville "Handbook of Epoxy Resins", McGraw-Hill Book Co., New York 1967, chapter 10, pages 1–12]. U.S. Pat. No. 3,280,054 discloses that it is possible to cure epoxy resins, in the absence of water, with adducts which are formed from polyamidoamines and polyepoxides.

German Offenlegungsschrift 1 520 918 proposes to use exactly these adducts and epoxy resins to prepare curable aqueous dispersions. It has been found, however, that the products so obtained often do not meet the requirements; in some cases, for example, the adducts, in particular the adducts prepared from aromatic polyepoxides, are semi-solid and are therefore not completely dispersible in aqueous medium, while aqueous dispersions comprising an aromatic epoxy resin and an adduct prepared from an aliphatic polyepoxide often show undesirable thixotropic behaviour. U.S. Pat. No. 3,383,347 proposes using phenol-modified amines as curing agents, which can be obtained as reaction products of a primary amino group of an aliphatic polyamine with a phenol and, where appropriate, of an aldehyde. However, the epoxy resin hardener emulsions obtained therewith have a short processing time and give very brittle coatings.

German Offenlegungsschrift 1 925 941 discloses epoxy resin hardener emulsions which comprise as hardener component an aminoamide adduct of an aminoamide consisting of an alkylene polyamine and a fatty acid. These emulsions are instable and often precipitate water already during the processing period. The relatively soft coatings prepared therefrom are susceptible to mechanical stress and are therefore unsuitable for the preparation of resistant protective coatings.

Swiss patent 487 955 proposes the use of aqueous dispersions which preferably additionally contain an accelerator for curing. The coatings prepared therewith are also relatively soft and are therefore only limitedly suited to, inter alia, mechanical stress.

Associates, consisting of a polyamidoamine adduct having a stoichiometric excess of a polyamidoamine, of an aliphatic epoxy compound and of a phenol/formaldehyde polyamine condensate, are proposed as curing agents for aqueous epoxy resin dispersions in German Offenlegungsschrift 2 332 177. However, organic water-dilutable solvents must be added to this mixture of epoxy resin prepolymer and curing agent to permit, by reducing the viscosity, their use as coating compound. Many organic solvents, however, carry risks known to the skilled person, such as inflammability, toxicity, environmental pollution, and the like.

In 2- or 3-component systems with epoxy resins, the working life of polyamine-terminated water-based polyamine hardeners, such as those described in U.S. Pat. No. 4,197,389, is usually too short. This can be remedied by reacting the polyamine-terminated curing component further with monofunctional amine-reactive compounds, for example with acrylonitrile, aliphatic or araliphatic monoepoxy compounds or monocarboxylic acids; and the salt formation of the polyamine adducts with inorganic or organic acids, such as acetic acid, which convert the polyamine adduct into a cationic and therefore water-dilutable form, may also be advantageous. [See U.S. Pat. Nos. 4,093,594; 4,246,148; 4,539,347 and 4,608,405]. However, both processing methods have disadvantages: The reaction of the polyamine adducts with reactive components results in a loss of NH-active hydrogen atoms and thus in an excess consumption of hardener. At the same time, the thermal stability of the hardener formulation decreases, i.e. at temperatures above 40° C. phase separation almost always occurs. Owing to the remaining ammonium salts, the reaction of polyamines with acids results in an increased corrosion tendency as well as in bubble formation on the surface coating which leads to a reduced stability of the chemicals.

Surprisingly, it has now been found that aqueous formulations comprising specific diaminocyclohexane adducts and epoxy resins have a drastically prolonged working life compared to formulations comprising customary polyamine adducts such as aliphatic or cycloaliphatic amine adducts or mixtures of meta-xylylenediamine/isophoronediamine adducts. This was not to be expected, as diaminocyclohexane adduct hardeners in solvent-free systems do not show this prolonged working life effect.

Accordingly, this invention relates to curable compositions comprising:

a) 10 to 90% by weight of at least one, optionally water-dilutable, water-emulsifiable or water-dispersible, epoxy resin having more than one epoxy group in the molecule, and b) 90 to 10% by weight of at least one polyamine adduct which predominantly corresponds to the idealised formula I and which is prepared from an adduct of formula A and a polyamine of formula XII,

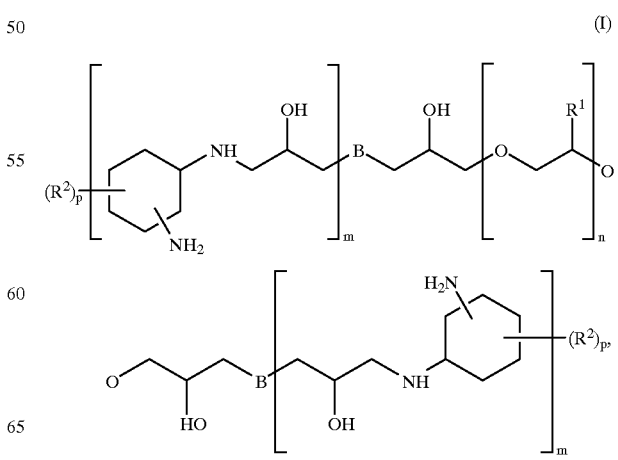

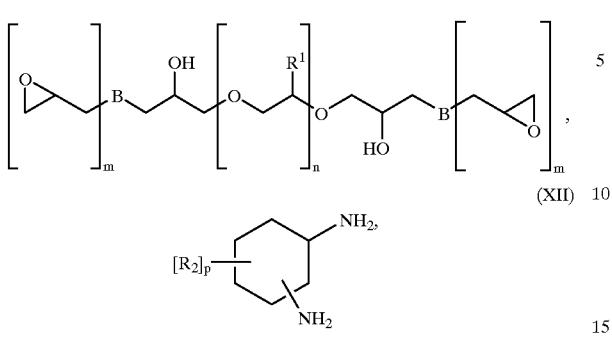

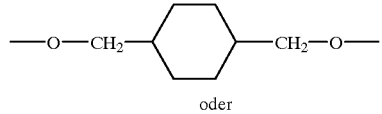

wherein the sum of the percentages by weight of components a) and b) is 100%, c) optionally, at least one further aliphatic, cycloaliphatic, aromatic/aliphatic, aromatic or heteroaromatic mono- or polyamine which may be modified by adduction, or mixtures thereof, and, d) optionally, at least one customary additive, wherein in formulae I or A and XII
$R^1$ is independently of one another —H or —CH$_3$,
$R^2$ is —H or $C_1$–$C_{12}$alkyl, and
p is 1, 2 or 3, the radicals B are each independently of one another a group of formulae II, III, IV, V, VI, VII, VIII, IX and X:

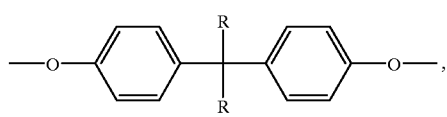

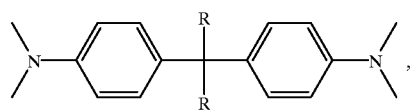

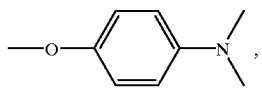

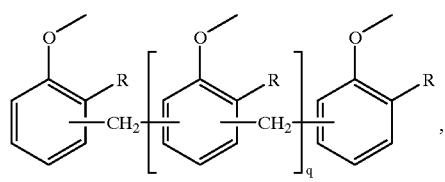

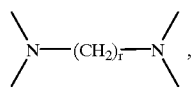

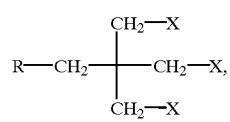

wherein

X is >N— or —O—,

R is —H or —CH$_3$, and q is an integer from 0 to 10, m in formulae I and A, depending on the functionality of unit B, is an integer from 1 to 11, and n is an integer from 2 to 100, and r in formulae VI and VII is an integer from 2 to 20.

Preferred ratios of components a) and b) are 40 to 90% by weight of component a) to 60 to 10% by weight of component b). Component c) is conveniently used in an amount of at most 30% by weight, preferably from 5 to 20% by weight, based on component b).

If $R^1$ in formulae I and A is different substitutents, then the compounds of formulae I and A are randomly distributed or grouped blockwise.

In formulae II, III, IV and V, the phenyl radicals can also be substituted by $C_1$–$C_{12}$alkyl or halogen atoms, preferably chloro or bromo.

In contradistinction to known compositions, e.g. those based on isophoronediamine/meta-xylyienediamine, the compositions of this invention with water-based epoxy resins have, at comparable NH-active equivalent weight (HAV for short), a substantially prolonged working life while having comparable curing properties. Surprisingly, it is in this case possible to forego further modification of the novel compositions by adduction or reaction with organic acids.

It has also been found that in a synergistic blend with specific metal salts, the novel compositions react faster, even in the presence of great amounts of water, while no, or hardly any, acceleration effects are found in solvent-free systems based on diaminocyciohexanes. Furthermore, it has been found that, surprisingly, the working life of the composition is not reduced in contrast to that of solvent-free systems containing accelerators.

The novel polyamine hardener component b) can usefully also be additionally modified by partially blending the component b) with a reaction product consisting of an adduct of the above formula A with a monoalkyl ether, e.g. ethylcarbitol, or with a secondary amine, such as di-n-butylamine, such that the viscosity of the novel adduct can be adjusted or reduced as desired. Component b) conveniently comprises up to 20 mol % of the component b) modified in this manner.

The monoalkyl ether conforms to formula XIII

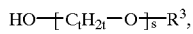
(XIII)

wherein
t is an integer from 2 to 4,
s is an integer from 1 to 5, and
$R^3$ is $C_1$–$C_6$alkyl, $C_6$–$C_{10}$aryl or $C_7$–$C_{11}$aralkyl.

Preferred compounds are those of formula XIII, wherein
t is an integer from 2 to 3,
s is an integer from 1 to 4, and
$R^3$ is $C_1$–$C_6$alkyl or $C_6$–$C_{10}$aryl.

Particularly preferred compounds are those of formula XIII, wherein
t is an integer from 2 to 3,
s is an integer from 1 to 3, and
$R^3$ is $C_1$–$C_6$alkyl.

Monoalkyl ethers of formula (XIII) are very particularly preferably polyethylene glycol monoalkyl ethers, polypropylene glycol monoalkyl ethers and polybutylene glycol monoalkyl ethers, in particular polyethylene glycol monoalkyl ether and polypropylene glycol monoalkyl ether, more preferably polyethylene glycol monomethyl ether, polypropylene glycol monomethyl ether, polyethylene glycol monoethyl ether and polypropylene glycol monoethyl ether. Diethylene glycol monoethyl ether (=ethylcarbitol) is very particularly preferred.

Suitable secondary amines have the general formula XIV:

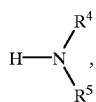
(XIV)

wherein $R^4$ and $R^5$ are each independently of the other $C_1$–$C_{18}$alkyl, $C_6$–$C_{10}$aryl, $C_7$–$C_{11}$aralkyl or, taken together, —$(CH_2)_4$—, —$(CH_2)_5$— or —$(CH_2)_2$—O—$(CH_2)_2$—

The secondary amines may additionally be functionalised, e.g. with hydroxyl groups; a typical example is diethanolamine.

Particularly preferred compounds are those of formula XIV, wherein $R^4$ and R5 are each independently of the other $C_1$–$C_{10}$alkyl or $C_6$–$C_{10}$aryl.

Very particularly preferred compounds are those of formula XIV, wherein $R^4$ and $R^5$ are each independently of the other $C_1$–$C_6$alkyl, but preferably di-n-butylamine, di(n-propyl)amine, di(isopropyl)amine and di(isobutyl)amine.

Mixtures of the above monoalkyl ethers or of the secondary amines can also be used.

Alkyl containing up to 18 carbon atoms referring to $R^2$ (up to $C_{12}$), $R^3$ (up to $C_6$), $R^4$ and $R^5$ in formulae XIII and XIV is a branched or straight-chain radical, typically methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethyl-hexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

$R^3$ and $R^4$/$R^5$ defined as $C_6$–$C_{10}$aryl typically include phenyl, methylphenyl (tolyl), dimethylphenyl (xylyl), trimethylphenyl(mesityl), ethylphenyl, propylphenyl, butylphenyl or naphthyl.

$R^4$ and $R^5$ defined as $C_7$–$C_{11}$aralkyl typically include benzyl, α-methylbenzyl, α,α-dimethylbenzyl or 2-phenylethyl, 2-methylbenzyl, 3-methylbenzyl, 4-methylbenzyl, 2,4-dimethylbenzyl, 2,6-dimethylbenzyl or 4-tert-butylbenzyl.

Epoxy resin a) may, in principle, be any epoxy resin customarily used for application.

Illustrative examples of epoxy resins used as component a) are:

I) Polyglycidyl and poly(β-methylglycidyl) esters which are obtainable by reacting a compound containing at least two carboxyl groups in the molecule and epichlorohydrin or β-methylepichlorohydrin. The reaction is conveniently carried out in the presence of a base.

Compounds containing at least two carboxyl groups in the molecule may suitably be aliphatic polycarboxylic acids. Examples of such polycarboxylic acids are oxalic acid, succinic acid, glutaric acid, adipic acid, pimelic acid, suberic acid, azelaic acid or dimerised or trimerised linoleic acid.

It is, however, also possible to use cycloaliphatic polycarboxylic acids such as tetrahydrophthalic acid, 4-methyltetrahydrophthalic acid, hexahydrophthalic acid or 4-methylhexahydrophthalic acid.

Aromatic polycarboxylic acids can also be used, typically phthalic acid, isophthalic acid and terephthalic acid.

II) Polyglycidyl or poly(β-methylglycidyl)ethers which are obtainable by reacting a compound containing at least two free alcoholic hydroxyl groups and/or phenolic hydroxyl groups and epichlorohydrin or β-methylepichlorohydrin, under alkaline conditions or in the presence of an acid catalyst and subsequent treatment with an alkali.

The glycidyl ethers of this type are typically derived from acyclic alcohols, typically from ethylene glycol, diethylene glycol and higher poly(oxyethylene)glycols, 1,2-propanediol or poly(oxypropylene)glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, pentaerythritol, sorbitol, as well as from polyepichlorohydrins.

They may also be derived from cycloaliphatic alcohols such as 1,4-cyclohexanedimethanol, bis(4-hydroxycyclohexyl)methane or 2,2-bis(4-hydroxycyclohexyl)propane, or they contain aromatic nuclei such as N,N-bis(2-hydroxyethyl)aniline or p,p'-bis(2-hydroxyethylamino)diphenylmethane.

The glycidyl ethers may also be derived from mononuclear phenols, typically from resorcinol or hydroquinone, or they are derived from polynuclear phenols such as bis(4-hydroxyphenyl)methane, 4,4'-dihydroxybiphenyl, bis(4-hydroxyphenyl)sulfone, 1,1,2,2-tetrakis-(4-hydroxyphenyl)ethane, 2,2-bis(4-hydroxyphenyl)propane, 2,2-bis(3,5-dibromo-4-hydroxyphenyl)propane, as well as from novolaks obtainable by condensation of aldehydes such as formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols of the type cited above.

III) Poly-(N-glycidyl) compounds obtainable by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane. The poly(N-glycidyl) compounds also include triglycidyl isocyanurate, N,N'-diglycidyl derivatives of cycloalkylene ureas such as ethylene urea or 1,3-propylene urea, and diglycidyl derivatives of hydantoins, typically of 5,5-dimethylhydantoin.

IV) Poly(S-glycidyl) compounds, preferably bis(S-glycidyl) derivatives which are derived from dithiols such as 1,2-ethanediol or bis(4-mercaptomethylphenyl)ether.

V) Cycloaliphatic epoxy resins, including bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxy resins in which the 1,2-epoxy groups are attached to different hetero atoms or functional groups. These compounds typically comprise the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

It is preferred to use epoxy resins having an epoxy content of 1 to 10 equivalents/kg, which are glycidyl ethers, glycidyl esters or N-glycidyl derivatives of aromatic, heterocyclic, cycloaliphatic or aliphatic compounds. The epoxy resins used are preferably liquid, i.e. they are either liquid resins or liquid mixtures of solid and liquid resins, or they are obtained as dispersions in water, if required together with small amounts of organic solvents.

Particularly preferred epoxy resins are polyglycidyl ethers of novolaks, more preferably of bisphenols, typically of 2,2-bis(4-hydroxyphenyl)propane (bisphenol A) or bis(4-hydroxyphenyl)methane (bisphenol F).

Very particularly preferred epoxy resins are diglycidyl ethers of bisphenol A or bisphenol F, and also epoxy novolaks.

Component b) in the novel compositions are the water-processable polyamine hardeners of formula I, wherein the polyamine hardener is soluble in water as solvent or may be dissolved in water by the addition of small amounts of water-soluble organic solvents.

The above formula I is an idealised structural formula and corresponds to the main component of those structures which are obtained in the preparation of these polyamine hardeners.

The compounds of formula I are prepared by per se known methods in a two-step process where, in a first step, a polyether polyol of formula XI

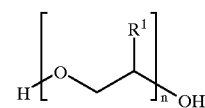

is reacted with a polyepoxide conveniently at elevated temperature to the adduct of formula A (e.g. in accordance with EP-A-0 000 605), wherein $R^1$ and n have the meanings cited above.

Elevated temperature usefully means e.g. a temperature range from 120 to 160° C. An epoxy compound having a molar excess from about 2 to 10 per mol of polyether polyol is conveniently used. An inert organic solvent may optionally also be used.

All customary polyepoxy resins within the meaning of above formula A, e.g. aliphatic, cycloaliphatic, aromatic or heteroaromatic polyepoxy resins, can be employed for the adduction reaction. Particularly preferred are the polyglycidyl ethers of polyvalent phenols, typically of 2,2-bis(4-hydroxyphenyl)propane (bisphenol A) or bis(4-hydroxyphenyl)methane (bisphenol F) or of novolaks, or of aliphatic polyols, preferably of straight-chain terminal diols, typically butanediol or hexanediol.

Polyether polyols of formula XI are the following conventional components of the technology (see Ullmanns Encyclopädie der technischen Chemie, 4. Ed., Vol. 19, Verlag Chemie GmbH, Weinheim 1980, pages 31–38 and pages 304, 305). They can be obtained, for example, by reaction of a starter with alkylene oxides, typically with ethylene oxide or propylene oxide. Suitable starters are all starters usually suitable for the preparation of polyether polyols having a functionality of 2 to 4, for example water, aliphatic, cycloaliphatic or aromatic polyhydroxy compounds having 2 to 4 hydroxyl groups, such as ethylene glycol, propylene glycol. Preferred polyether polyols are those based on ethylene oxide and/or propylene oxide, the ethylene/propylene oxide copolymers being randomly distributed or block copolymers. The ratio of ethylene oxide to propylene oxide can vary within wide limits. It is, for example, possible that only the terminal hydroxyl groups of the polyether polyols are reacted with ethylene oxide (end capping). The ethylene oxide units content of the polyether polyols suitable for component b) can also have values of e.g. up to 75 or 80%. It will usually be convenient for the polyether polyols to be end-capped at least with ethylene oxide, because they will then have terminal primary hydroxyl groups which are more reactive towards the epoxy components used than the secondary hydroxyl groups obtained from the reaction with propylene oxide.

The condensate of formula A so obtained is then reacted in a second step with an amine of the above formula XII [optionally with the addition of a less than stoichiometric amount of a monofunctional alcohol (monoalkyl ether of formula (XIII) or of a secondary amine of formula (XIV) for the modification of component b)], with heating, to the component of formula I and, where required, the resulting mixture is diluted with water. In the synthesis, these compounds are usually obtained as mixtures. The reaction may be carried out e.g. in the temperature range from 40 to 120° C., optionally in the presence of an inert organic solvent. It is convenient to use a c. 1–10-fold molar excess of diamine of formula XII per mol of condensate A.

Typical examples of diaminocyclohexane derivatives of formula XII are the following:

$R^2$ defined as $C_1$–$C_{12}$alkyl is typically methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl. The alkyl group $R^2$ preferably contains 1 to 6, more preferably 1 to 4, carbon atoms. Alkyl $R^2$ is particularly preferably methyl.

Typical examples of amines of formula XII are:

1,2-, 1,3- and 1,4-diaminocyclohexane, 1,3-diamino-2-methyl- or -4-methylcyclohexane.

The compounds of formula I are novel compounds. Preferred compounds are those of formula I wherein $R^2$ is —H or —CH$_3$, and p is 1, and m, depending on the functionality of unit B, is an integer from 1 to 5, and n is an integer from 4 to 25, and B has the meanings stated above.

Of particular interest are polyamine hardeners of formula I, wherein $R^2$ is —H, and p is 1, and the two amino groups are in ortho-position to each other, or $R^2$ is —CH$_3$, and p is 1, and the two amino groups are in meta-position to each other, the radicals B are independently of one another a group of formulae II, III, IV and V (II)

(III)

(IV)

(V)

or of formula VI —O—(CH$_2$)$_r$—O—, wherein r is an integer from 2 to 10, and R and q have the meanings stated above.

Of very particular interest are polyamine hardeners of formula I, wherein $R^2$ is —H, and p is 1, and the two amino groups are in ortho-position to each other, and the radicals B have the meaning stated above, q in formula V being 0 to 3, and r in formula VI being 4 or 6.

Examples of processes for the preparation of the novel polyamine hardeners in accordance with formula I are discussed in the experimental part.

As mentioned above, the novel compositions may comprise as further component c) additives of aliphatic, cycloaliphatic, aromatic/aliphatic, aromatic or heteroaromatic mono- or polyamines. These added amines serve to modify the performance properties of the novel polyamine adducts of formula I. For example, the reactivity/working life profile of the novel hardeners as compared to the epoxy resin component a) can be adjusted by the addition of more reactive polyamines to the adduct of formula I. Most conveniently, the additional amines are added after the adducting reaction of adduct A (polyepoxy/polyether polyol) and of the diaminocyclohexane derivative of formula XII is complete and before water is added to the novel component b). This process is exemplified in the experimental part.

Mono- or polyamines which may optionally be modified by adduction are, for example, reaction products with monoepoxy resins, Michael condensates addition products using unsaturated compounds, typically acrylonitrile, or reaction products of the mono- or polyamines with monocarboxylic acids.

Illustrative examples of mono- and polyamines as component c) are:

ethylenediamine, 1,2- and 1,3-propylenediamine, 2-methyl-1,5-diaminopentane (DYTEK-A®, DuPont), hexamethylenediamine, N-aminoethylethanolamine, diethylenetriamine, triethylenetetramine, tetraethylenepentadiamine, dipropylenetriamine, 2,2,4-trimethyl-1,6-diaminohexane, meta-xylylenediamine, N-2-aminoethylpiperazine, 2,5(2,6)-bis(aminomethyl) bicyclo(2.2.1)heptane, bis(4-amino-3-methylcyclohexyl)methane, bis(4-aminocyclohexyl) methane, 1,3-diamino-4-methylcyclohexane, 1,2-diaminecyclohexane, 4,4'-diaminodiphenylmethane.

The amount of component d) depends on the respective embodiment of this invention and can therefore be completely variable, e.g. from 0 to 98% by weight, based on the total weight of components a), b), c) and d).

Illustrative examples of additional additives used as component d), some of which are commercially available, are the following:

Extenders, fillers, reinforcing agents, such as coal tar, bitumen, textile fibres, glass fibres, asbestos fibres, boron fibres, carbon fibres, mineral silicates, mica, quartz powder, aluminium oxide hydrate, bentonite, wollastonite, kaolin, silica aerogel or metal powders, e.g. aluminium powder or iron powder, and also pigments or pigment pastes, and colourants, such as carbon black, oxide colours and titanium dioxide, flame retardants, thixotropic agents, flow control agents, such as silicones, waxes and stearates, some of which are also used as demoulding agents; antifoams, reactive thinners, plasticisers, antioxidants and light stabilisers.

As mentioned above, the novel compositions can be used as synergistic mixtures in combination with an accelerator of formulae $M^+X^-$ or $M^{2+}X^-_2$, wherein $M^+$ and $M^{n+}$ are an alkali metal ion or alkaline earth metal ion, and $X^-$ is any inorganic and/or organic anion, provided that these accelerators are soluble in the composition.

Such metal salt accelerators are known, inter alia, from EP-A-0 471 988, where they are proposed for accelerating the curing of epoxy resin systems.

These accelerators may also be used in a 10–90% blend with polyether polyol-containing polyamines, such as the commercially available ®Jeffamines of the ED/D- or T-type [supplied by Texaco Chemical Co.]. Polyalkylene oxide is typically polyethylene oxide or polypropylene oxide.

Preferred synergistic mixtures are those, wherein the alkali metal cation or alkaline earth metal cation is lithium or magnesium and/or calcium, and the anion is $X^-$ perchlorate, nitrate, laurylsulfate, acetate or iodide.

Very particularly preferred synergistic mixtures are those, wherein the alkali metal ion is $Li^+$, the alkaline earth metal cation $M^{2+}$ is calcium or magnesium, and the anion $X^-$ is nitrate or perchlorate. $M^{2+}$ is particularly preferably calcium, and $X^-$ is particularly preferably nitrate.

The metal salt accelerators are normally used in a concentration from 0.1 to 10% by weight, preferably from 1 to 6% by weight, based on the solids content of the polyamine hardener of formula I.

It is also possible to use 10 to 90% blends with ®Jeffamines of the ED/D- or T-types or similar polyether polyols, preferably a 50% blend with ®Jeffamine ED 600.

In addition to shortening the drying time, these metal salt accelerators can also have a favourable influence on the surface aspect, e.g. the gloss.

The preparation of the novel compositions can be carried out in conventional manner, typically by mixing the components of the compositions by manual stirring or by stirring with known mixing units or dispersion aids (stirrers, kneaders, rolls, ball mills, toothed disks, and the like).

The novel compositions are suitable, for example, for the preparation of matrix systems, laminates, paints, primers, coatings, finishings, fillers, knife fillers, sealing and injection compounds, immersion resins and casting resins, adhesives, and the like, as well as for the modification of concretes, mortars, and the like, and/or as adhesion promoters on concretes, plastic materials, woods, natural and synthetic fibres, papers, and the like. They are particularly suitable for the preparation of moulded articles and coatings.

Application of the novel compositions is conveniently carried out in the temperature range from –5 to 200° C., preferably from 5 to 120° C. The cure can be carried out in per se known manner in one or several steps. It is usually carried out at ambient temperature or by heating the composition to temperatures in the range from e.g. 30 to 120° C., particularly preferably from 35 to 100° C. Owing to the mentioned excellent properties of the novel compositions, a very wide range of different performance problems can be solved.

Accordingly, the invention also relates to crosslinked products obtainable by curing the novel compositions.

The invention is illustrated by the following Examples wherein the abbreviations listed below are used:

| | |
|---|---|
| EEW | epoxy equivalent weight, i.e. the amount of a resin or reaction product comprising 1 mol of epoxy groups. |
| EEW (prod.) | epoxy equivalent weight of the product obtained. |
| $HAV_{(=NH^+\text{-active})}$ | amine-hydrogen equivalent weight, i.e. the amount of an amine or amine hardener comprising 1 mol of $NH_2$ groups, based on the solids content of the hardener formulation. |
| $M_m$ | average molecular weight |
| Et | ethyl |
| IPD | isophoronediamine = 1-amino-3-aminoethyl-3,5,5-trimethylcyclo-hexane |
| MXDA | meta-xylylenediamine |

EXPERIMENTAL PART

Preparation of the Polyether Polyol/polyepoxy Intermediates in Accordance with Formula A and Their Modification (Examples 5 and 6)

General Processing Instructions

A specific amount of a polyether polyol and a polyepoxy compound is dissolved, with vigourous stirring, in an inert gas atmosphere. The mixture is heated to a temperature of 100° C. in the vessel and charged with a specific amount of a $BF_3.EtNH_2$ catalyst (see mol amounts in the Examples). The temperature in the vessel is elevated, with vigorous stirring, to the range from 120 to 180° C. and the reaction mixture is kept at this temperature until the desired epoxy value of the product is obtained.

Example 1:

0.3 mol of polyethylene oxide ($M_m$=1000)
1.3 mol of diglycidyl ether of bisphenol F (EEW=160 g/mol)

11.5 mmol of $BF_3 \cdot EtNH_2$
T=130° C., t=3 h, EEW (prod.)=340 g/equiv. of epoxy Example 2:

0.3 mol of polyethylene oxide ($M_m$=1000)
1.3 mol of diglycidyl ether of bisphenol A (EEW=185 g/mol)
11.5 mmol of $BF_3 \cdot EtNH_2$
T=130° C., t=2.5 h, EEW (prod.)=381 g/equiv. of epoxy Example 3:

0.3 mol of polyethylene oxide ($M_m$=1000)
0.78 mol of diglycidyl ether of bisphenol A (EEW=185 g/mol)
0.52 mol of diglycidyl ether of bisphenol F (EEW=160 g/mol)
17.7 mmol of $BF_3 \cdot EtNH_2$
T=130° C., t=3 h, EEW (prod.)=375 g/equiv. of epoxy Example 4:

0.3 mol of polyethylene oxide ($M_m$=1000)
1.3 mol of diglycidyl ether of bisphenol A/F (6:4, EEW=175 g/mol)
11.5 mmol of $BF_3 \cdot EtNH_2$
T=130° C., t=3 h, EEW (prod.)=366 g/equiv. of epoxy Example 5:

Modification (functionalisation) of the intermediate obtained according to Example 4 with diethylene glycol monoethyl ether(ethylcarbitol):
product of Example 4 (EEW=366 g/equiv. of epoxy)
+0.2 mol of ethylcarbitol
T=130° C., t=1 h, EEW (prod.)=430 g/equiv. of epoxy.
The product corresponds to a modified component b), as mentioned at the outset.

Example 6:

Modification of the intermediate obtained in accordance with Example 4 with di-n-butylamine:
Product of Example 4 (EEW=373 g/equiv. of epoxy)
+0.2 mol of di-n-butylamine
T=130° C., t=5 h, EEW (prod.)=414 g/equiv. of epoxy Example 7:

0.48 mol of polyethylene oxide ($M_m$=1000)
0.48 mol of triblock copolymer PEO-PPO-PEO
(®Pluronics PE 4300: $M_m$=1700)
2.5 mol of diglycidyl ether of bisphenol A (EEW=185 g/mol)
1.6 mol of diglycidyl ether of bisphenol F (EEW=160 g/mol)
17.7 mmol of $BF_3 \cdot EtNH_2$
T=130° C., t=3.5 h, EEW (prod.)=400 g/equiv. of epoxy
PEO means: polyethylene oxide
PPO means: polypropylene oxide Example 8:

0.77 mol of polyethylene oxide ($M_m$=1000)
0.19 mol of ABA triblock copolymer PEO-PPO-PEO
(®Pluronics PE 3100: $M_m$=1100)
2.5 mol of diglycidyl ether of bisphenol A (EEW=185 g/mol)
1.6 mol of diglycidyl ether of bisphenol F (EEW=160 g/mol)
17.7 mmol of $BF_3 \cdot EtNH_2$
T=130° C., t=3.5 h, EEW (prod.)=375 g/equiv. of epoxy Example 9:

0.3 mol of polyethylene oxide ($M_m$=1000)
2.7 mol of novolak polyglycidyl ether of bisphenol F
[EPN 1179: (EEW=170 g/mol)]
9 mmol of $BF_3 \cdot EtNH_2$
T=155° C., t=4.5 h, EEW (prod.)=365 g/equiv. of epoxy Example 10:

0.3 mol of polyethylene oxide ($M_m$=1000)
2.0 mol of novolak polyglycidyl ether of bisphenol F
[EPN 1179: (EEW=170 g/mol)]
13 mmol of $BF_3 \cdot EtNH_2$
T=150° C., t=2.5 h, EEW (prod.)=495 g/equiv. of epoxy Preparation of the Novel Polyamine Adduct Hardener of Formula I General Processing Instructions for Liquid Resin Adducts A specific amount (based on the intermediate of formula A) of 1,2-diaminocyclohexane or 1,3-diamino-4-methylcyclohexane (as indicated in the Examples) is placed in a reactor in an inert gas atmosphere at a bath temperature of 40° C. and then, with stirring, the intermediate (described in the Examples) is added in the respective amounts such that the exothermic reaction is kept at 40–50° C. The reaction mixture is kept at this temperature for 1–2 hours and subsequently the temperature in the reactor is raised for 1 hour to 100° C. After cooling to 40–70° C., the product is adjusted with a specific amount of water to a solids content of 70–80% by weight (see Examples 11 to 19).

Example 11:

30 g of the intermediate of Example 1
13 g (0.11 mol) of 1,2-diaminocyclohexane
10.75 g of water
solids content=80% by weight
$NH^+$-active=146.5 g/equiv. of $NH^+$
viscosity: 12800 mPa·s Example 12:

35.5 g of the intermediate of Example 2
15 g (0.13 mol) of 1,2-diaminocyclohexane
12.7 g of water
solids content=80% by weight
$NH^+$-active=146 g/equiv. of $NH^+$
viscosity: 37100 mPa·s Example 13:

193 g of the intermediate of Example 3
63 g (0.55 mol) of 1,2-diaminocyclohexane 64 g of water
solids content=80% by weight
NH$^+$-active=190 g/equiv. of NH$^+$
viscosity: 60000 mPa·s Example 14:

163 g of the intermediate of Example 3
93 g (0.8 mol) of 1,2-diaminocyclohexane
63.9 g of water
solids content=80% by weight
NH$^+$-active=113 g/equiv. of NH$^+$
viscosity: 10000 mPa·s Example 15:

35 g of the intermediate of Example 4
16.3 g (0.13 mol) of 1,3-diamino-4-methylcyclohexane
12.8 g of water
solids content=80% by weight
NH$^+$-active=151 g/equiv. of NH$^+$
viscosity: 20000 mPa·s Example 16:

50 g of the intermediate of Example 5
22 g (0.19 mol) of 1,2-diaminocyclohexane
18 g of water
solids content=80% by weight
NH$^+$-active=140 g/equiv. of NH$^+$
viscosity: 15000 mPa·s Example 17:

50 g of the intermediate of Example 6
20.1 g (0.176 mol) of 1,2-diaminocyclohexane
17.5 g of water
solids content=80% by weight
NH$^+$-active=150 g/equiv. of NH$^+$
viscosity: 19000 mPa·s Example 18:

35.5 g of the intermediate of Example 7
15.5 g (0.14 mol) of 1,2-diaminocyclohexane
12.75 g of water
solids content=80% by weight
NH$^+$-active=140 g/equiv. of NH$^+$
viscosity: 17300 mPa·s Example 19:

35 g of the intermediate of Example 8
15 g (0.14 mol) of 1,2-diaminocyclohexane
12.5 g of water
solids content=80% by weight
NH$^+$-active=144.5 g/equiv. of NH$^+$
viscosity: 19200 mPa·s Modification of the novel adducts [formula I] by the addition of a second more reactive polyamine [component c)] according to per se known methods after the reaction of the epoxy-containing intermediate with 1,2-diaminocyclohexane is complete:

Example 20:

35 g of the intermediate of Example 4 (EEW=386 g/mol of epoxy)
9.6 g (0.084 mol) of 1,2-diaminocyclohexane
8.25 g (0.048 mol) of isophoronediamine [component c)]
13.2 g of water
solids content=80% by weight
NH$^+$-active=153 g/equiv. of NH$^+$
viscosity: 29400 mPa·s Example 21:

35 g of the intermediate of Example 8 (EEW=375 g/mol of epoxy)
11.5 g (0.10 mol) of 1,2-diaminocyclohexane
3.95 g (0.024 mol) of meta-xylylenediamine [component c)]
12.6 g of water
solids content=80% by weight
NH$^+$-active=148 g/equiv. of NH$^+$
viscosity: 36000 mPa·s Example 22:

35 g of the intermediate of Example 8 (EEW=375 g/mol of epoxy)
8.14 g (0.07 mol) of 1,2-diaminocyclohexane
6.17 g (0.053 mol) of 2-methyl-1,5-diaminopentane [component c)]
12.3 g of water
solids content=80% by weight
NH$^+$-active=152 g/equiv. of NH$^+$
viscosity: 33900 mPa·s Example 22-I:

35 g of the intermediate of Example 8 (EEW=386 g/mol of epoxy)
10.11 g (0.088 mol) of 1,2-diaminocyclohexane
6.44 g (0.042 mol) of 2,5(2,6)-bis(aminomethyl)bicyclo(2.2.1)heptane
[NBDA; component c)]
12.88 g of water
solids content=80% by weight
NH$^+$-active=120 g/equiv. of NH$^+$
viscosity: 29000 mPa·s General Processing Instructions for Epoxy Novolak Adducts [Formula I, Wherein B=Formula V]

A specific amount of diaminocyclohexane is placed in a reactor in an inert gas atmosphere at a bath temperature of 90° C. and then, with stirring, the intermediate of Example 9 or 10 dissolved in toluene is added, such that the exothermic reaction is kept at a temperature of 90° C. in the vessel. The reaction mixture is kept at this temperature for 2 hours and then the temperature in the vessel is slowly raised to 200° C., all the while distilling off the solvent toluene. Upon reaching a temperature of 150° C. in the vessel, a sufficient vacuum is applied and excess diaminocyclohexane is removed from the reaction mixture by distillation. After cooling the reaction mixture to 60° C., the product remaining in the reactor is diluted with a specific amount of water to a solids content of 70–80% by weight.

Example 23:

48 g of the intermediate of Example 9
dissolved in 12 g of toluene
15 g (0.13 mol) of 1,2-diaminocyclohexane (excess 75 g)
17 g of water
solids content=78% by weight
$NH^+$-active=205 g/equiv. of $NH^+$
viscosity: 44800 mPa·s

Example 24:

48 g of the intermediate of Example 10 dissolved in 12 g of toluene
12 g (0.1 mol) of 1,2-diaminocyclohexane (excess 60 g)
26 g of water
solids content=70% by weight
$NH^+$-active=265 g/equiv. of $NH^+$
viscosity: 48600 mPa·s General Processing Instructions for Polyamine Hardeners Comprising an Accelerator A specific amount (based on the intermediate) of diaminocyclohexane is placed in a reactor in an inert gas atmosphere at a bath temperature of 40° C. and then the respective intermediate (described in the Examples 1–10) is added such that the exothermic reaction is kept at 40–500° C. The reaction mixture is kept at this temperature for 1–2 hours and then the temperature in the vessel is raised for 1 hour to 100° C. After cooling to 50° C., the product is charged with the metal salt dissolved in water (0.1–10% by weight, based on the solids of the adduct). The novel synergistic mixture is adjusted to a solids content of 70–80% by weight in a specific amount of water.

Example 25:

35.5 g of the intermediate of Example 3
16 g (0.14 mol) of 1,2-diaminocyclohexane solids content=80% by weight
$NH^+$-active=140 g/equiv. of $NH^+$ Application Examples General Processing Instructions for the Preparation, Application and Testing of Coatings Based on the Novel Compositions 100 g of a liquid epoxy resin based on a mixture of bisphenol A and bisphenol F having an EEW of about 180 (Table 1) or 100 g of an emulsion based on a solid epoxy resin based on bisphenol A (EEW 500–540), solids content of the emulsion about 55% by weight (Table 2), are thoroughly mixed with x g (exact amounts see Tables 1 and 2) of one of the novel polyamine hardeners. If required, the mixture is diluted with deionised water to achieve a solids content of 55–60% by weight. Using a film drawing frame or a knife coater, the paint formulation so obtained is coated on a suitable substrate (e.g. glass plates, metal plates) at a wet film thickness of about 200 μm. The coatings so obtained are fully cured at room temperature. The paint properties of the coatings so obtained are indicated in Tables 1 (liquid resin) and 2 (solid resin emulsion).

"Working life" will be understood to denote the period of time after the epoxy resin and the polyamine hardener are mixed, during which the gloss of a coating applied does not diminish more than 10%.

"Dust dry time" will be understood to denote the period of time during which sand strewn on the coating (grain size: about 0.2 mm) adheres.

TABLE 1

Paint properties of coatings based on the novel polyamine hardeners and a liquid epoxy resin (® Araidit PY 340-2, EEW about 180)

| formulation No. | 1 | 2 | 3 | 4 | 5 | 6 | 7 | 8 | 9 | 10 | 11 | 12 | 13 | 14 | 15 | 16 | 16-I |
|---|---|---|---|---|---|---|---|---|---|---|---|---|---|---|---|---|---|
| polyamine hardener acc. to synthesis Example No. | 11 | 12 | 13 | 14 | 15 | 16 | 17 | 18 | 19 | 20 | 21 | 22 | 23 | 24 | 25 | 26 | 22-I |
| amount of polyamine hardener [g] | 82 | 82 | 107 | 64 | 82 | 75 | 82 | 82 | 79 | 82 | 82 | 82 | 130 | 147 | 79 | 79 | 80 |
| working life [h][1] | 5 | >6 | 7 | 8 | 3 | 3 | 6 | 7 | 7 | 5 | 3.5 | 5 | 5 | 3 | 5 | 5 | 3.5 |
| dust-dry time [h][2] | 10 | 8 | 11 | 11 | 6.5 | 11 | 12 | 9 | 8 | 8 | 6 | 11 | 3.7 | 10 | 3 | 1 | 5.5 |
| film forming | o.k. | o.k. | o.k. | o.k. | o.k. | o.k. | o.k. | o.k. | o.k. | o.k. | o.k. | o.k. | o.k. | o.k. | o.k. | o.k. | o.k. |
| flow | o.k. | o.k. | o.k. | o.k. | o.k. | o.k. | o.k. | o.k. | o.k. | o.k. | o.k. | o.k. | o.k. | o.k. | o.k. | o.k. | o.k. |
| pendulum hardness (Persoz) after 7 days [s][3] | 327 | 329 | 320 | 314 | 312 | 280 | 320 | 302 | 320 | 325 | 335 | 288 | 315 | 257 | 349 | 340 | 320 |

Film forming o.k. means that the result of a visual assessment is okay.
Flow o.k. means that the result of a visual assessment is okay.
[1]Reflexion measurement on BYK contrast cards; reflexion angle 60° C., decrease of about 10%.
[2]According to Dr. Landolt (Chemical and Physical Test Methods for Epoxy Resin Systems; S.15; Ciba; Dec.1991).
[3]According to ISO Norm 1552/73.

2.06 g of $LINO_3$ dissolved in 13.4 g of water
solids content=80% by weight
$NH^+$-active=140 g/equiv. of $NH^+$

Example 26:

35.5 g of the intermediate of Example 3
16 g (0.14 mol) of 1,2-diaminocyclohexane
1.54 g of $Ca(NO_3)_2$ dissolved in 13 g of water

TABLE 2

Paint properties of coatings based on the novel polyamine hardeners and an emulsion based on a solid epoxy resin
(® Araldit PZ 3961 EEW 500-540)

| formulation No. | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| polyamine hardener acc. to synthesis Example No. | 11 | 12 | 13 | 14 | 15 | 16 | 17 | 18 | 19 | 20 | 21 | 22 | 23 | 24 | 25 | 26 |
| amount of polyamine hardener [g] | 14.7 | 14.7 | 20 | 12 | 16.5 | 13.5 | 14.7 | 16.7 | 15.3 | 14.5 | 14.5 | 14.5 | 23 | 24 | 14.5 | 14.5 |
| working life [h] | 4 | 4 | 4 | 3.5 | 2.75 | 3 | 4 | 4 | 4 | 2.5 | 2.5 | 2.5 | 4 | 4 | 4 | 4 |
| dust-dry time [h] | 2.5 | 2.5 | 2.5 | 2 | 2.5 | 3 | 2 | 2 | 2.5 | 1.5 | 1.25 | 1.5 | 3.5 | 3 | 0.7 | 0.5 |
| film forming | o.k. | o.k. | o.k. | o.k. | o.k. | o.k. | o.k. | o.k. | o.k. | o.k. | o.k. | o.k. | o.k. | o.k. | o.k. | o.k. |
| flow | o.k. | o.k. | o.k. | o.k. | o.k. | o.k. | o.k. | o.k. | o.k. | o.k. | o.k. | o.k. | o.k. | o.k. | o.k. | o.k. |
| pendulum hardness (Persoz) after 14 days [s] | 242 | 235 | 317 | 346 | 310 | 285 | 280 | 272 | 285 | 282 | 285 | 270 | 275 | 100 | 305 | 244 |

Film forming o.k. means that the result of a visual assessment is okay.
Flow o.k. means that the result of a visual assessment is okay.

What is claimed is:

1. A curable composition, comprising
   a) 10 to 90% by weight of at least one, optionally water-dilutable, water-emulsifiable or water-dispersible, epoxy resin having more than one epoxy group in the molecule;
   b) 90 to 10% by weight of at least one polyamine adduct which predominantly corresponds to the formula I and which is prepared from an adduct of formula A and a polyamine of formula XII,

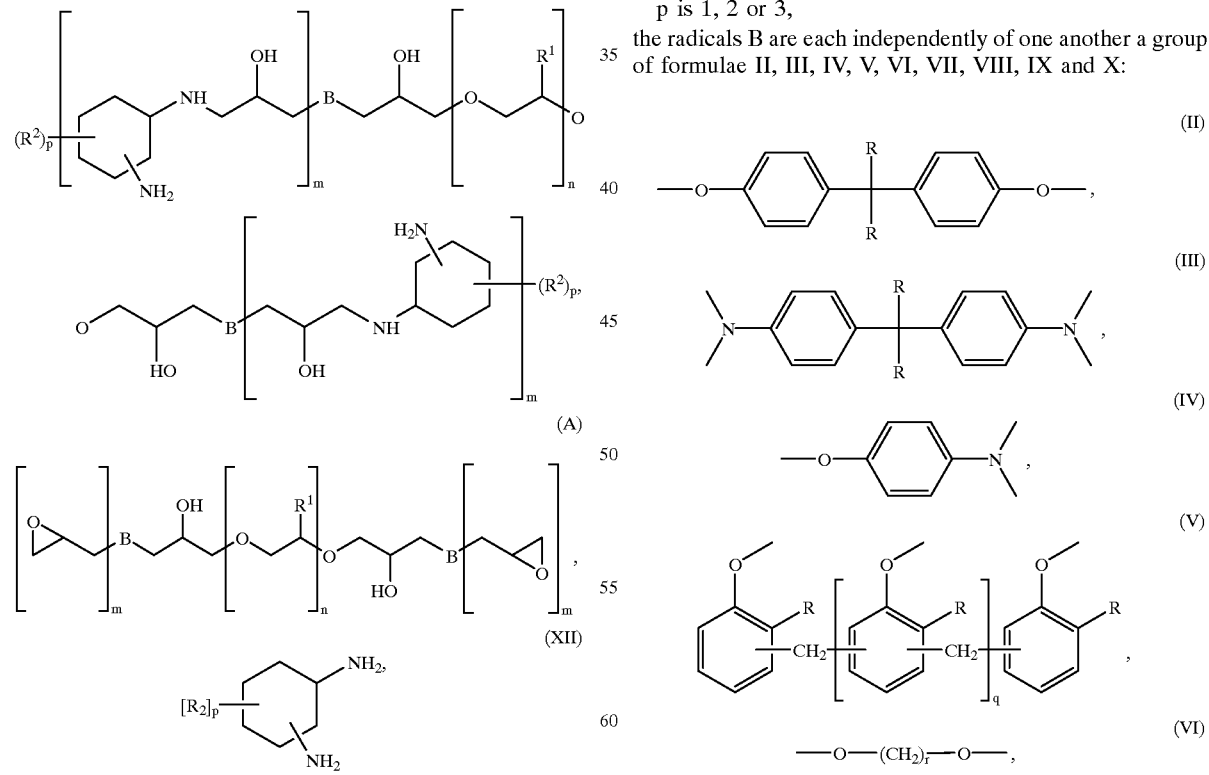

wherein the sum of the percentages by weight of components a) and b) is 100%;
   c) optionally, at least one further aliphatic, cycloaliphatic, aromatic/aliphatic, aromatic or heteroaromatic mono- or polyamine which is unmodified or modified by adduction; and,
   d) optionally, at least one customary additive selected from the group consisting of extenders, fillers, reinforcing agents, pigments, pigment pastes, colourants, flame retardants, thixotropic agents, flow control agents, demoulding agents, antifoams, reactive thinners, plasticisers, antioxidants and light stabilisers;

wherein in formulae I, A and XII $R^1$ is independently of one another —H or —$CH_3$, $R^2$ is —H or $C_1$–$C_{12}$ alkyl, and p is 1, 2 or 3, the radicals B are each independently of one another a group of formulae II, III, IV, V, VI, VII, VIII, IX and X:

-continued $$R-CH_2-\underset{CH_2-X}{\overset{CH_2-X}{\underset{|}{C}}}-CH_2-X,\quad(X)$$

$$-O-CH_2-\text{cyclohexyl}-CH_2-O-\quad(VIII)$$

oder $$\underset{/}{\overset{\backslash}{N}}-CH_2-\text{cyclohexyl}-CH_2-\underset{\backslash}{\overset{/}{N}}\quad(IX)$$

wherein

X is >N— or —O—,

R is —H or —CH$_3$, and q is an integer from 0 to 10, m in formulae I and A, depending on the functionality of unit B, is an integer from 1 to 11, and n is an integer from 2 to 100, and r in formulae VI and VII is an integer from 2 to 20.

2. A curable composition according to claim 1, wherein in formula I

R$^2$ is —H or —CH$_3$, and p is 1, and m, depending on the functionality of unit B, is an integer from 1 to 5, and n is an integer from 4 to 25.

3. A curable composition according to claim 2, wherein in formula I

R$^2$ is —H, and p is 1, and the free amino groups are in the ortho-position to the other amino groups bound to the adduct of formula A, or R$^2$ is —CH$_3$, and p is 1, and the free amino groups are in the meta-position to the other amino groups bound to the adduct of formula A, the radicals B are independently of one another a group of formulae II, III, IV and V $$-O-\text{Ar}-\underset{R}{\overset{R}{C}}-\text{Ar}-O-,\quad(II)$$

$$\underset{/}{\overset{\backslash}{N}}-\text{Ar}-\underset{R}{\overset{R}{C}}-\text{Ar}-\underset{\backslash}{\overset{/}{N}},\quad(III)$$

$$-O-\text{Ar}-\underset{\backslash}{\overset{/}{N}}\quad\text{oder}\quad(IV)$$

$$-O-\text{Ar}(OCH_3,R)-CH_2-[\text{Ar}(OCH_3,R)-CH_2-]_q\text{Ar}(OCH_3,R)\quad(V)$$

or of formula VI —O—(CH$_2$)$_r$—O—, wherein r is an integer from 2 to 10.

4. A curable composition according to claim 3, wherein in formula I

R$^2$ is —H, and p is 1, and the free amino groups are in the ortho-position to the other amino groups bound to the adduct of formula A, wherein in formula V q is 0 to 3, and r in formula VI is 4 or 6.

5. A curable composition according to claim 1, wherein the adduct A is partially modified with a monoalkyl ether or a secondary amine.

6. A curable composition according to claim 1, wherein an accelerator of formula M$^+$X$^-$ or M$^{2+}$X$^-_2$ is used as additional component, wherein M$^+$ or M$^{2+}$ is an alkali metal ion or an alkaline earth metal ion, and X$^-$ is any inorganic and/or organic anion, which accelerator is soluble in the curable composition.

7. A curable composition according to claim 6, wherein M$^+$ is Li$^+$, and M$^{2+}$ is Mg$^{2+}$ or Ca$^{2+}$, and X$^-$ is ClO$_4^-$, NO$_3^-$, laurylsulfate, acetate or iodide.

8. A curable composition according to claim 7, wherein M$^+$ is Li$^+$, and M$^{2+}$ is Mg$^{2+}$ or Ca$^{2+}$, and X$^-$ is ClO$_4^-$ or NO$_3^-$.

9. A curable composition according to claim 8, wherein M$^{2+}$ is Ca$^{2+}$ and X$^-$ is NO$_3^-$.

10. A curable composition according to claim 6, wherein the accelerator is present in a 10 to 90% blend with at least one polyalkylene oxide-containing polyamine.

11. A curable composition according to claim 10, wherein the polyamine is ®Jeffamine of the ED/D- or T-series.

12. A curable composition according to claim 10, wherein the accelerator is present in 50% blend with ®Jeffamine ED 600.

13. The moulded articles and coatings obtained by curing the composition according to claim 1.

* * * * *